United States Patent
Kuan

(10) Patent No.: US 6,619,194 B1
(45) Date of Patent: Sep. 16, 2003

(54) OMNI-BEARING PEELER

(76) Inventor: Huo Feng Hsia Kuan, No. 32, Lane 2, Show-Gang Wu Street, Hsin-Tien, Taipei Hsien (TW)

( * ) Notice: Subject to any disclaimer, the term of this patent is extended or adjusted under 35 U.S.C. 154(b) by 0 days.

(21) Appl. No.: 10/291,621

(22) Filed: Nov. 12, 2002

(30) Foreign Application Priority Data

Oct. 14, 2002 (TW) .......................................... 02282817

(51) Int. Cl.[7] .............................. A47J 17/00; A23L 1/00; B26B 11/00; B26B 29/00
(52) U.S. Cl. ........................ 99/588; 99/584; 30/279.6; 30/280; 30/304; 30/123.5
(58) Field of Search .................... 99/537, 538, 567, 99/568, 584, 635, 588–591, 542–545; 30/280, 283, 279.6, 121.5, 278, 282, 315, 239, 142, 149, 169, 123.5, 123.7, 114, 279.2, 299, 303, 304; 15/236.05, 236.08; D7/695

(56) References Cited

U.S. PATENT DOCUMENTS

| | | | | |
|---|---|---|---|---|
| 691,861 A | * | 1/1902 | Hemstrom ................. 30/280 X |
| 2,106,796 A | * | 2/1938 | De Vault .................. 30/280 X |
| 2,238,425 A | * | 4/1941 | Morris ..................... 99/588 X |
| 2,266,278 A | * | 12/1941 | Senkewitz ................ 99/588 X |
| 2,274,815 A | * | 3/1942 | Whann ..................... 99/588 X |
| 2,355,312 A | * | 8/1944 | Lui ............................. 99/588 |
| 2,556,528 A | * | 6/1951 | Elkington .................... 99/588 |
| 2,614,324 A | * | 10/1952 | Greenidge ................... 99/588 |
| 2,645,851 A | * | 7/1953 | Ferrin ....................... 30/123.5 |
| 4,776,092 A | * | 10/1988 | Moores et al. ............. 30/123.5 |
| 5,279,035 A | * | 1/1994 | Cohen et al. ............. 99/588 X |
| 5,737,842 A | * | 4/1998 | Freedman .................... 30/280 |
| 5,865,110 A | * | 2/1999 | Yonezawa .................... 99/588 |

* cited by examiner

Primary Examiner—Timothy F. Simone
(74) Attorney, Agent, or Firm—Troxell Law Office PLLC

(57) ABSTRACT

An omni-bearing peeler includes a knife holder, a handle and a catch device. The knife holder has a wing part at two opposite lateral sides thereof respectively and two frame plates at a lower portion thereof with a frame groove in between. The frame groove at two opposite ends thereof is provided with a cap hole and a cover hole respectively. The handle provides a step hole at an end thereof being received in the frame groove and between the cap hole and the cover hole. The step hole at a circumferential edge thereof provides at least two guide grooves and a step ring groove arranged at lower portions of the guide grooves so as to communicate with the guide grooves. The catch device has a button with an upper cap and a lower stop ring. The upper cap passes through the step hole and is received in the cap hole, the lower stop ring is against the ring grooves with the lower stop ring extending at least an engaging tenon from a surface thereof to be received in one of the guide grooves so as to form a state of engagement and has a cover blocking the cover hole with a spring being disposed between the cover and the button.

12 Claims, 4 Drawing Sheets

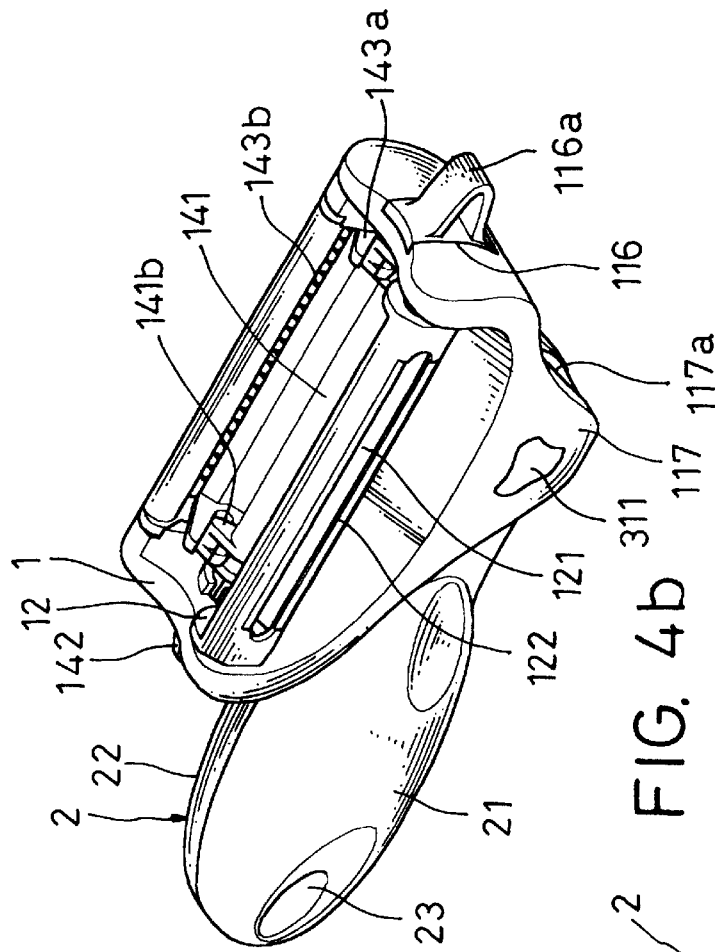
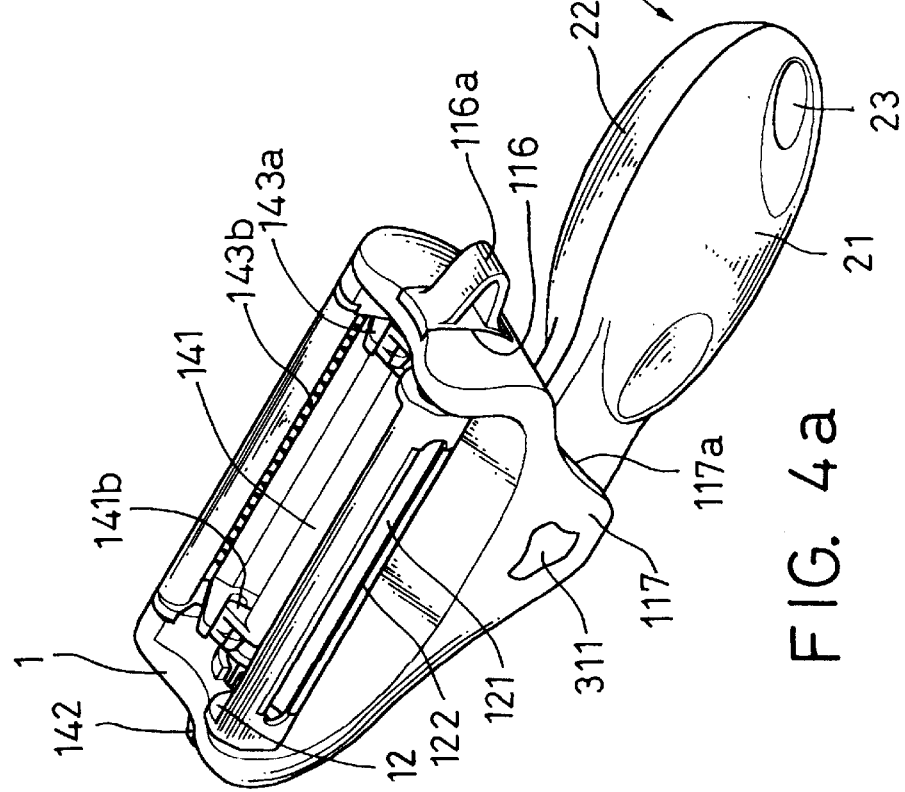

OMNI-BEARING PEELER

BACKGROUND OF THE INVENTION

1. Field of the Invention

The present invention relates to an omni-bearing peeler, and particularly to a peeler, which has an axially connected handle under a knife holder with a catch device between the handle and the knife holder and the handle can be rotationally located toward right or the left side by way of pressing the button in the catch device to perform omni-bearing operations.

2. Description of Related Art

Vegetables and fruits have been used as foods in our daily life since very ancient times. Due to the increasing incomes of ours, the cooked foods and the cold vegetable and fruit plates are demanded to be getting delicate so that the housewife in the family or the person frequently eating raw vegetables know to prepare vegetable lumps or vegetable shred such as peeled or shredded potato, cucumber, carrot and etc. is full of miscellaneous trifles and it is very easy with carelessness to result in incised wounds accidentally so that it is inconvenient to perform the peeling or the shredding job unless skillful knife work is provided. Hence, the peeler and the vegetable making have been developed for the preceding needs.

The conventional peeler has a Y shaped frame with an open end thereof axially attached with an arc shaped paring knife and the paring knife keeps contact with the treated food. Because the Y shaped frame is made integrally, the part of the hand between the thumb and the index finger faces up and the fingers hold the handle during the peeler being held for work. However, the knife holder has to be inversed to keep contact with the treated food for peeling work while in use and it is an inefficient operation to carry out the peeling work by way of the reversed peeler although we have accustomed to the conventional peeler for a long time and have neglected to create other better alternatives. Besides, the conventional shred making board has a flat board insetting with a shred making knife screen with a plurality of inclining cutting holes for cutting the passing treated food into shreds. However, it is not possible to reduce the shred making board has into a handhold type. From the preceding deficiencies of conventional peeler and shred making board, there still has a very wide space for developing new peeling tool for vegetable and fruits.

SUMMARY OF THE INVENTION

The crux of the present invention is to provide an omni-bearing peeler, which includes a knife holder, a handle and a catch device. The knife holder has a wing part at two opposite lateral sides thereof respectively and two frame plates at a lower portion thereof with a frame groove in between. The frame groove at two opposite ends thereof is provided with a cap hole and a cover hole respectively. The handle provides a step hole at an end thereof being received in the frame groove and between the cap hole and the cover hole. The step hole at a circumferential edge thereof provides at least two guide grooves and a step ring groove arranged at lower portions of the guide grooves so as to communicate with the guide grooves. The catch device has a button with an upper cap and a lower stop ring. The upper cap passes through the step hole and is received in the cap hole, the lower stop ring is against the ring grooves with the lower stop ring extending at least an engaging tenon from a surface thereof to be received in one of the guide grooves so as to form a state of engagement and has a cover blocking the cover hole with a spring being disposed between the cover and the button. By way of the button being pressed, the spring can be compressed and the engaging tenon can move downward along one of the guide grooves such that the state of engagement is released for the handle being turned with facility; and when the other one of the guide grooves moves to a spot, at which the engaging tenon is located, the spring stretches to urge the button moving upward such that the engaging tenon engages with the other one of the guide grooves to change an angular position and a location of the handle with respect to the knife holder.

BRIEF DESCRIPTION OF THE DRAWINGS

The present invention can be more fully understood by reference to the following description and accompanying drawings, in which:

FIG. 4a is a perspective view illustrating the peeler having been adjusted the handle thereof; and FIG. 4b is another perspective view illustrating the peeler having been adjusted the handle thereof.

DETAILED DESCRIPTION OF THE PREFERRED EMBODIMENT

Figure 1:
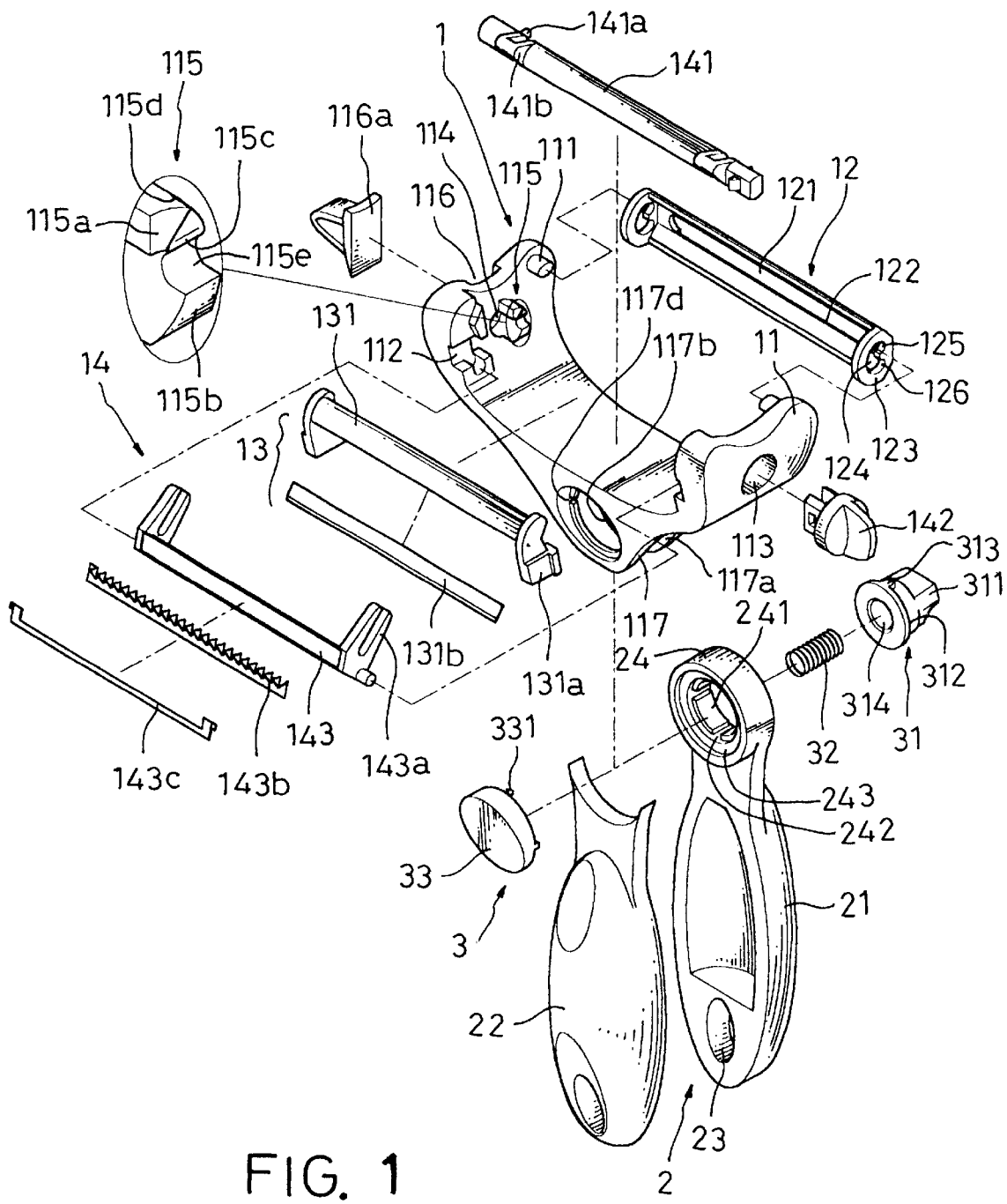
FIG. 1 is an exploded perspective view of an omni-bearing peeler of the present invention.
Figures 2A, 2B:
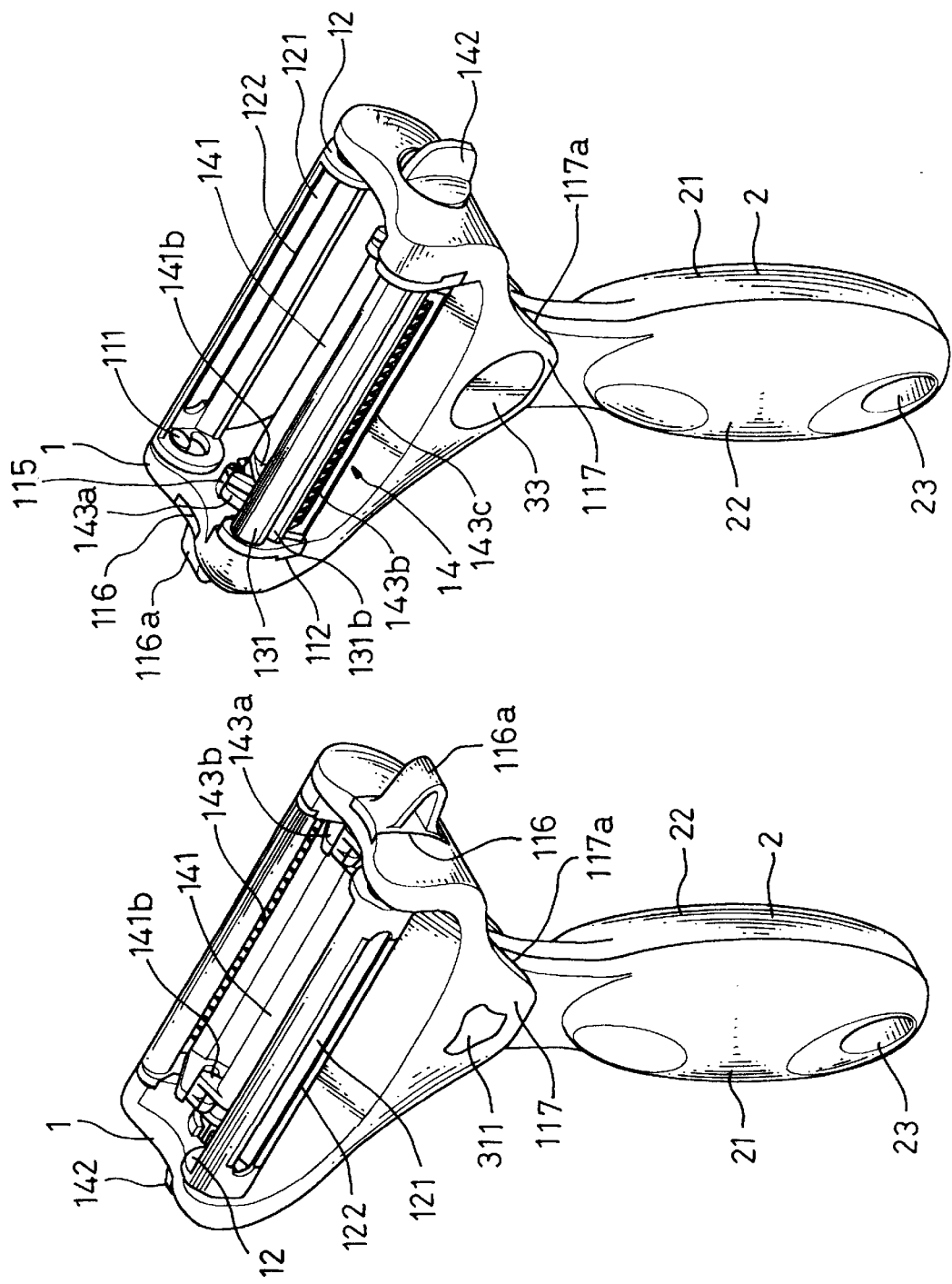
FIG. 2a is an assembled perspective view of the omni-bearing peeler shown in FIG. 1.
FIG. 2b is another assembled perspective view of the omni-bearing peeler shown in FIG. 1.

Referring to FIGS. 1 to 3, an omni-bearing peeler according to the present invention is comprised of a knife holder 1, a handle 2 and a catch device 3.

Wherein, the knife holder 1 is an inversed triangular shaped frame with an upper left and right wing parts 11. A pivot 111 extends from the wing parts 11. respectively for pivotally connecting with a paring knife 12. The paring knife 12 has a knife groove 121 with the top and the bottom edges thereof being a knife-edge 122 and has a lateral wing piece 123 with a hollow circular recess 124 at both ends thereof respectively. The upper and the lower ends of the circular recess 124 are engaging ends 125,126 corresponding to the pivots 111. When the pivots 111 at both wing parts 11 engage with the upper engaging ends 125 of the circular recesses 124, the paring knife 12 exposes for peeling the skins of vegetables and fruits as a peeler. When the paring knife 12 is turned downward and the two pivots 111 engage with the other ends 126, the paring knife 12 is in a state of being located in position with the knife-edge 122 facing inward and the paring knife 12 is impossible for use.

Besides, in order to increase other functions, a slicing device 13 is disposed between the wing parts 11 and opposite to the paring knife 12. Each of the wing parts 11 at the inner wall thereof is provided with an inversed L shaped recess 112 for receiving a respective fitting jut 131a at both ends of a base lever 131. A cutter 131b is inserted into the base lever 131 at the lower portion thereof in a slant direction. Hence, sliced product can be obtained while the shave 131b peels along the skin of a vegetable or a fruit.

In addition, the omni-bearing peeler of the present invention further includes a shredding device 14 with a linking rod 141 being disposed between the two wing parts 11. An end of the linking rod 141 is disposed at a through hole 113 in one of the wing parts 11 to connect with a turning knob 142 and the other end thereof is disposed at the an axial hole 114 of the other wing part 11 to engage with the other wing part 11 by way of a radial jut 141a on the linking rod 141 being attached to a lock piece 115 extending from the inner side of the axial hole 114. The lock piece 115 has two stop walls 115a, 115b and a wave shaped rail 115c is disposed between the two stop walls 115a, 115b with intersection spots of the wave shaped rail 115c and the two stop walls 115a, 115b forming a receiving recess 115d and an extending recess 115e. As soon as the knob 142 is stirred, the radial jut 141a of the linking rod 141 is limited by the lock piece 115 so that the linking rod 141 only rotates within an angle between the two stop walls 115a, 115b. Besides, the linking rod 141 at both end parts thereof has a U shaped cam 141b for fitting with a U shaped holding arm 143a disposed at both ends of a swing frame 143. The swing frame 143 at the front side thereof is integrally attached with zigzag blades 143b and the zigzag blades 143b are fixedly retained to the swing frame 143 with a locating strip 143c. Thus, the two cams 141b can displace in the U shaped holding arms 143a and force the swing frame 143 to rotate while the two cams rotates with the linking rod 141 such that the zigzag blades 143b can slide in or out along the flat surfaces of the two wing parts 11. When the operation of peeling is in use, the zigzag blade 143b cuts into the surface of a vegetable or a fruit to form equidistant notch grooves and then the paring knife 131b peels the surface off the vegetable or the fruit to make shredded products.

In fact, the other wing part 11 at opposite side of the knob 142 has an insert groove 116 for being inserted with a V shaped dig-ear 116A such that dig-ear 116A can remove the recess part or corrupt part of the vegetable or the fruit with the knob to avoid excessive and unnecessary peeling.

The handle 2 has a shape of elongated ellipse and is composed of two joining handle halves 21, 22. The handle 2 at the lower end thereof has a hanging hole 23 and at the upper end thereof extends a handle head 24 for being received in an engaging groove 117a formed between two frame plates 117 at the bottom of the knife holder 1 such that the handle 2 and the knife holder 1 can be fastened together by way of the catch device 3. Hence, the handle 2 can be rotated 90° to the right or to the left so as to be disposed parallel to the knife holder 1 as shown in FIGS. 4a and 4b in addition to being disposed perpendicular to the knife holder 1 like the conventional peeler does so that the peeler of the present invention can provide omni-bearing functions. Further, the handle head 24 is provided with a step hole 241 with the inner wall thereof having four guide grooves 242 spacing apart from each other with an equiangular distance respectively. An annular groove 243 is arranged at the lower ends of the guide grooves 242 so that the guide grooves 242 can communicate with each other for an adjustable knob 31 of the catch device 3 being able to displace longitudinally.

Figure 3A:
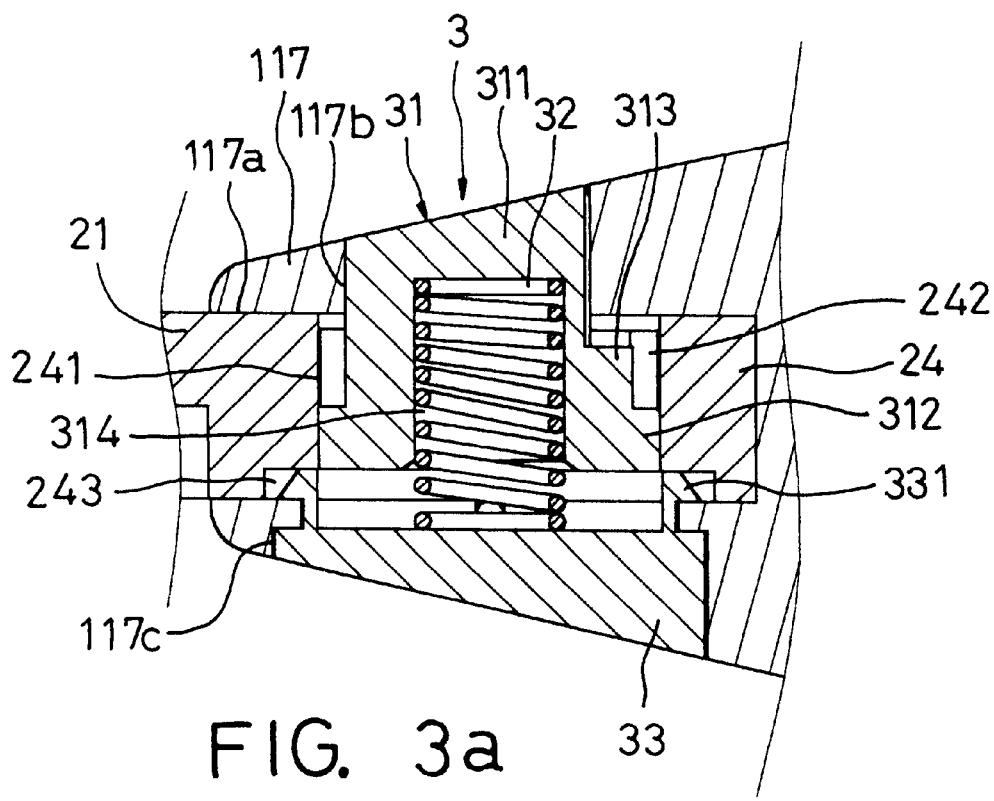
FIG. 3a is a sectional view of a catch device in the peeler shown in FIG. 1 illustrating a state of operation.

The catch device 3 includes a button 31, a spring 32 and a cover 33. The button 31 has a pin shape and is axially connected between the handle 2 and the knife holder 1 and has a shape of step cap with an approximate Y shaped button cap 311 and a lower extending outward big stop ring 312. The stop ring 312 at the periphery thereof has two opposite engaging tenons 313 and a locating nest 314 is disposed at the lower end of the button 31 for receiving a spring 32. The engaging groove 117a between the two frame plates 117 is provided a cap hole 117b and a cover hole 117c at both lateral sides thereof respectively corresponding to the upper cap 311 and the cover 33. In case of assembling the catch device, the step hole 241 of the handle 2 is received in the engaging groove 117a to align with the cap hole 117b and the cover hole 117c and then the button 31 is placed inside via the cover hole 117c with the two engaging tenons 313 being received in the two opposite guide grooves 242 such that the stop ring 312 can be in the ring groove 243 against the upper inner wall thereof to allow the top portion of the button cap 311 being received in the cover hole 117c without escaping outward. Meanwhile, the spring 32 is placed in the locating nest 314 and two engaging hooks 331 at the inner periphery of the cover 33 engage with two engaging recesses 117d in the ring groove 243 against another end of the spring 32 as shown in FIG. 3a.

Figure 3B:
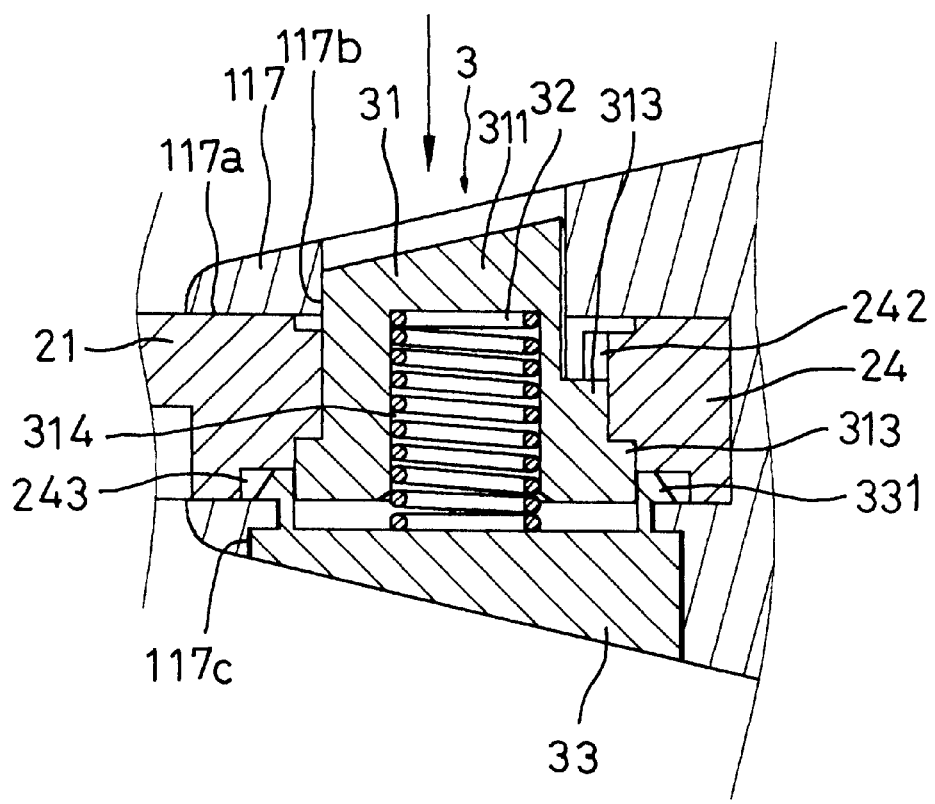
FIG. 3b is another sectional view of the catch device illustrating another state of operation.

If the direction of the handle 2 is needed to change, the only thing has to be down is to press the button cap 311 as shown in FIG. 3b and allow the two engaging tenons moving downward along the opposite guide grooves 242. Thus, the engaging tenons 313 can press the spring 32 and move to the ring grooves 243. Under this circumstance, the function of catching is lost and the handle 2 can be turned to the left side or the right side such that the engaging tenons 313 can press against the upper inner wall of the ring grooves 243 and displace along the ring grooves 243 till meeting the other pair of opposite guide grooves 242. At this moment, the spring 32 stretches and the two engaging tenons 313 fall into the other pair of guide grooves 242 to form the state of catching as shown in FIGS. 4a and 4b.

It is appreciated that omni-bearing peeler of the present invention has the handle thereof with three direction adjustments corresponding to the knife holder to peering vegetables or fruits by way of the handle being adjusted in parallel with the paring knife in addition to complying with the right hand or left hand operation habit of the user. Hence, the present invention has broken through the unchanged operation way of the traditional peeler as omni-bearing functions. Besides, the peeler of the present invention further provides multi-functions such as shaving and shredding other than the function of peeling.

While the invention has been described with reference to the a preferred embodiment thereof, it is to be understood that modifications or variations may be easily made without departing from the spirit of this invention, which is defined by the appended claims.

What is claimed is:

1. An omni-bearing peeler, comprising:
  a knife holder, having a wing part at two opposite lateral sides thereof respectively, having two frame plates at a lower portion thereof with a frame groove in between and the frame groove at two opposite ends thereof being-provided a cap hole and a cover hole respectively;
  a handle, providing a step hole at an end thereof being received in the frame groove and between the cap hole and the cover hole, the step hole at a circumferential edge thereof providing at least two guide grooves and a step ring groove being arranged at lower portions of the guide grooves so as to communicate the guide grooves;
  a catch device, having a button with an upper cap and a lower stop ring, the upper cap passing through the step hole and being received in the cap hole, the lower stop ring being against the ring grooves with the lower stop ring extending at least an engaging tenon from a surface thereof to be received in one of the guide grooves so as to form a state of engagement and having a cover blocking the cover hole with a spring being disposed between the cover and the button;

whereby, by way of the button being pressed, the spring can be compressed and the engaging tenon can move downward along one of the guide grooves such that the state of engagement is released for the handle being turned with facility; and when the other one of the guide grooves moves to a spot, at which the engaging tenon is located, the spring stretches to urge the button moving upward such that the engaging tenon engages with the other one of the guide grooves to change an angular position and a location of the handle with respect to the knife holder.

2. The omni-bearing peeler as defined in claim 1, wherein a rotary paring knife is axially connected between the two wing parts of the knife holder with the paring knife at a front side thereof having an elongated recess, at an upper and a lower edges thereof having a knife-edge respectively, at both lateral sides thereof having a wing plate with a circular recess respectively and at both ends thereof being an engaging end respectively for the rotary paring knife being able to be attached to an extending pivot on the wing parts respectively so that the knife has the knife-edge thereof facing forward or backward as soon as the paring knife is turned to allow the two engaging ends engaging with the pivots respectively.

3. The omni-bearing peeler as defined in claim 2, wherein the step hole at the circumferential edge thereof is provided with four equidistant guide grooves and the stop ring at the surface thereof extends two opposite engaging tenons to be received in two opposite ones of the guide grooves to form a state of engagement; and when the engagement is released and the handle is turned with the step hole synchronously, another two opposite ones of the guide grooves move to two positions, at which the two tenons are located, and the spring stretches to urge the button moving upward such that the two tenons engage with the another two opposite ones of the guide grooves.

4. The omni-bearing peeler as defined in claim 1, wherein a slicing device is disposed between the two wing parts at another sides thereof and the slicing device further comprises a base lever between the wing parts with a cutter being inserted into the base lever in a slant direction to cut a treated food into slices.

5. The omni-bearing peeler as defined in claim 4, wherein the base lever at both ends thereof provides a fitting jut respectively and the two wing parts at inner walls thereof provide an inverted L shaped recess corresponding to the fitting jut so that the base lever can join with the two wing parts.

6. The omni-bearing peeler as defined in claim 4, wherein a shredding device is disposed under the slicing device and the shredding device comprises:

a linking rod, being axially connected to the two wing parts, an end thereof passing through, one of the wing parts and being joined to a knob and another end thereof at a conjunction thereof having a radial jut to engage with a lock piece disposed at an inner wall of the other one of the wing parts and both ends of the linking rod extend a cam respectively opposite to the radial jut; and a swing frame, having a U shaped holding arm being provided at both ends thereof corresponding to the cams so as to fit with the cams and having a plurality of equidistant zigzag blades at a front side thereof;

whereby, while the knob is turned, the radial juts form two fixed points and the two cams can rotate and displace in the U shaped holding arms such that the zigzag blades can slide in or out along flat surfaces of the two wing parts; and the blades cut into the surface of the treated food to form equidistant notch grooves and then the paring knife cuts the treated food into shredded shapes.

7. The omni-bearing peeler as defined in claim 6, wherein the knob acts as a digging tool.

8. The omni-bearing peeler as defined in claim 6, wherein the zigzag blades are integrally attached to a plate fixed to the swing frame.

9. The omni-bearing peeler as defined in claim 6, wherein the lock piece extends a wave rail between the two stop walls and has two ends thereof forming a receiving part and a extending part.

10. The omnni-bearing peeler as defined in claim 1, wherein one of the wing parts provides an insert groove to be inserted with a V shaped dig-ear as a digging tool.

11. The omni-bearing peeler as defined in claim 1, wherein the handle is composed of two opposite handle halves.

12. The omni-bearing peeler as defined in claim 1, wherein the handle at a lower end thereof has a hanging hole.

* * * * *